May 18, 1965  G. WILLIAMS  3,184,669
HOROLOGICAL INSTRUMENT MOTOR

Filed Dec. 3, 1963  3 Sheets-Sheet 1

GRAHAM WILLIAMS,
Inventor

Moore, Hall & Pollock
Attorneys

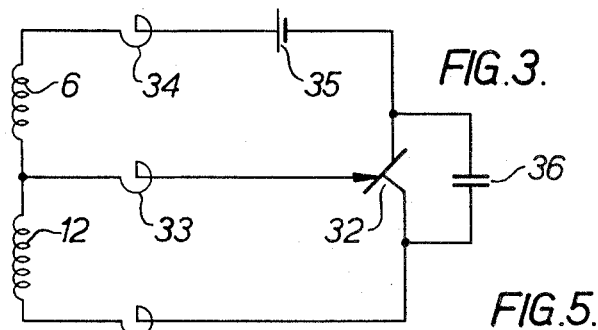
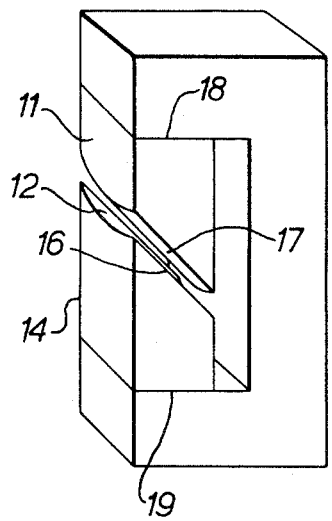
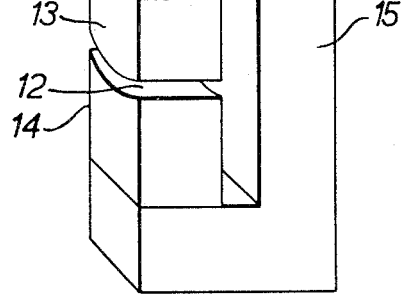
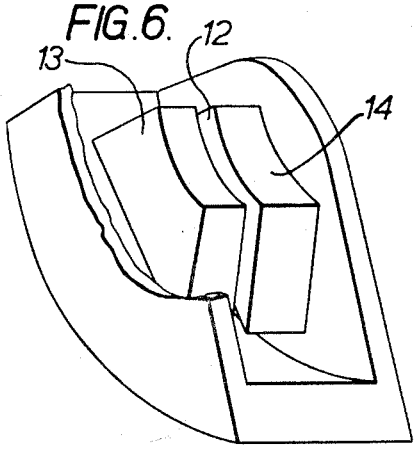

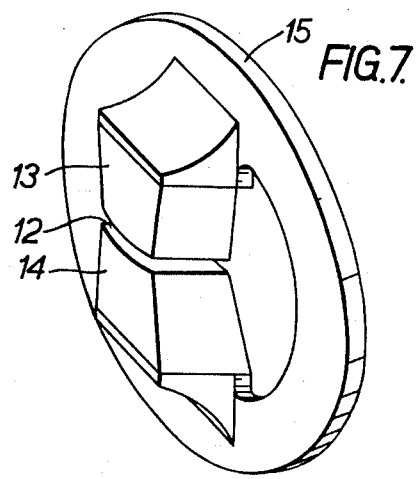
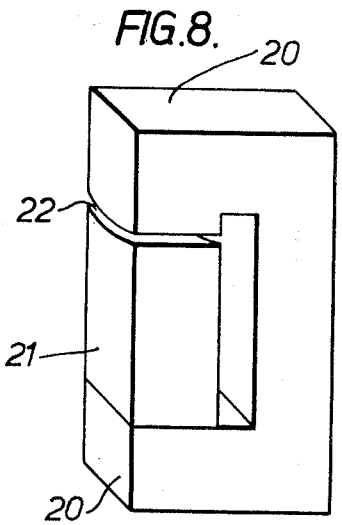
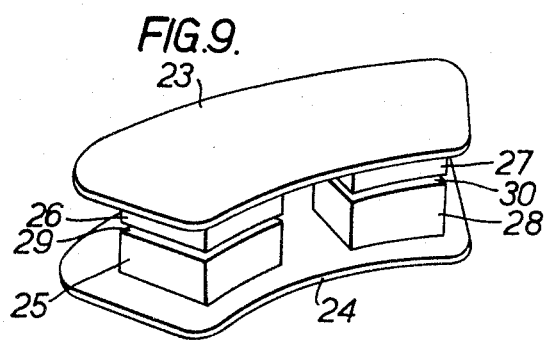

United States Patent Office 3,184,669
Patented May 18, 1965

3,184,669
HOROLOGICAL INSTRUMENT MOTOR
Graham Williams, Shurdington, Cheltenham, England, assignor to S. Smith & Sons (England) Limited, London, England, a British company
Filed Dec. 3, 1963, Ser. No. 327,670
Claims priority, application Great Britain, Dec. 19, 1962, 47,869/62
11 Claims. (Cl. 318—129)

This invention relates to horological instruments, and is more particularly concerned with a new oscillatory motor for a horological instrument such as a watch.

Horological instruments have been proposed in which one or more coils are mounted on an oscillating member (such as a balance wheel or a pendulum) subjected to a restoring force (produced by a spring or gravity) substantially proportional to the displacement of the member from a datum position, the coil or coils co-operating with one or more fixed magnets, so that E.M.F.'s are induced in the coil or coils, the E.M.F. induced in the coil or in one of the coils being applied to a circuit (incorporating one or more transistors) which produces an output signal in the form of a current pulse. This output signal is applied to the same coil or one or more other coils which co-operates or co-operate with the magnet or magnets to produce a force in such a sense as to maintain oscillation by the oscillating member. The requisite energy to drive conventional indicating means is mechanically derived from the oscillating member, being eventually supplied by a D.C. voltage source associated with the circuit. Such horological instruments will hereafter be called "horological instruments of the kind referred to."

According to this invention I provide a horological instrument of the kind referred to, having an oscillatory motor comprising at least one permanent magnet constructed from a high energy magnetic material and at least one member constructed from a high permeability magnetic material arranged so as to form a magnetic circuit with a gap, the high energy product not less than $5 \times 10^6$ gauss-oersteds.

The high energy magnetic material may have a working field strength of not less than 550 oersteds and a working flux density of not less than 8,000 gauss or a working field strength of not less than 750 oersteds and a working flux density of not less than 6,000 gauss.

Preferably the high energy magnetic material has an energy product of not less than $7 \times 10^6$ gauss-oersteds.

Preferably the high permeability magnetic material in such that, at a flux density of 15,000 gauss, the field strength is not greater than 20 oersteds.

Preferably the length of the gap in the direction of the magnetic flux is not greater than about one third of the length of any dimension of a face of the gap which passes through the centroid of that face.

Preferably the length of the gap in the direction of the magnetic flux is not greater than about one third of the length of the magnet or the total length of the magnets in the direction of the magnetic flux.

Preferably the oscillatory motor for said horological instrument comprises first and second magnets disposed on opposite sides of the gap. The faces of the magnets adjacent to the gap may be covered by thin slices of high permeability magnetic material.

Preferably the flux density over at least 75% of the gap area is at least 60% of the maximum flux density in the gap.

Preferably the total flux through the gap is at least 25% of the total flux through the magnet or magnets.

In a convenient arrangement for a watch, the gap is disposed in a plane parallel to the back and the dial of the watch and approximately midway between the back and the dial; the first magnet is disposed in contact with a piece of high permeability magnetic material itself disposed adjacent to (or constituting) the back of the watch; and the second magnet is disposed in contact with a piece of high permeability magnetic material itself disposed adjacent to (or constituting) the dial of the watch.

It may be shown from the general theory of permanent magnets that the required length of the permanent magnet or magnets for a given flux density in a gap is inversely proportional to the working field strength of the material. It may similarly be shown that for a given flux density in a gap of given length and cross-sectional area the required volume of the permanent magnet is inversely proportional to the product of the working flux density ($B_w$) and the working field strength ($H_w$). The energy stored in a magnetic material is proportional to the product, $B_w \times H_w$, known as the energy product, so that it is necessary to use high energy magnetic materials if the volume taken up by magnets is to be as small as possible.

Horological instruments in accordance with this invention will now be described with reference to the accompanying drawings of which:

FIGURE 3 is a circuit diagram showing a watch circuit embodying the structure of FIGURES 1 and 2; and FIGURES 4–9 show alternative arrangements of magnets in magnetic circuits constructed in accordance with further embodiments of the present invention.

Figure 2:
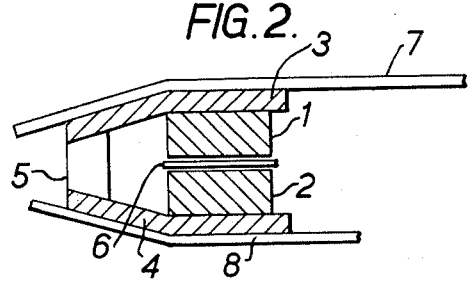
FIGURE 2 is a sectional elevation along the line II—II in FIGURE 1, showing an arrangement of magnets in a magnetic circuit (FIGURE 2 is not on the same scale as FIGURE 1)

Referring first to FIGURE 2, two similar permanent magnets 1 and 2 are placed adjacent to each other with a gap between them. The sides of the magnets 1 and 2 adjacent to the gap provide magnetic poles of opposite polarity. Two coils 6 and 12 (only 6 is indicated in FIGURE 2) wound on a common former are mounted on a balance wheel (not shown) and oscillate, in operation, through the gap between the magnets 1 and 2. Pieces 3, 4 and 5 made from a high permeability magnetic material, connect together the poles of the magnets 1 and 2 not adjacent to the gap, that is they interconnect the sides of magnets 1 and 2 opposite to the sides thereof which are adjacent to the gap. The piece 3 is adjacent to the dial 7 of the watch and the piece 4 is adjacent to the case back 8 of the watch. A magnetic circuit is formed by the magnet 1, piece 3, piece 5, piece 4, magnet 2, and the gap between the magnets 1 and 2.

The magnets 1 and 2 (see FIGURE 1) are of a trapezoidal shape. The pieces 3, 4 and 5 are much wider than the magnet 1 and 2 so that the reluctance of the path through the pieces 3, 4 and 5 is negligible in comparison to that of the gap.

The circular outline of the path of the balance wheel and its associated coils 6 and 12 is shown at 9 about a center 10. The outside pirimeter of the case is shown at 11.

The path 9 of the coils 6 and 12 through the gap between the magnets 1 and 2 subtends an angle of 24° about the center 10.

The magnets 1 and 2 are cut from a chilled mould cast of a high energy crystal orientated magnetic material such as aluminum-nickel-cobalt-copper-iron alloys sold under the trade names "Columax" and "Ticonal GX."

It is characteristic of the magnets cut from a chilled mould cast of a high energy crystal orientated magnetic material that the reluctance is smallest in the direction of crystal growth in the mould, and is at a maximum in directions at 90° to the direction of growth. The magnets 1 and 2 are cut from the magnetic material so that their minor sides are parallel to the direction of the smallest reluctance and their major sides are parallel to the direction of the greatest reluctance. This has the effect of reducing "fingering" as a flux tends to remain parallel to the minor sides of the magnets 1 and 2.

The magnetic material of the magnets 1 and 2 has the following properties:

Maximum energy product (BH max.)   $7.0 \times 10^6$ gauss-oersteds.
Flux density (at BH max. point) ____ $10.5 \times 10^3$ gauss.
Field strength (at BH max. point) ___ 650 oersteds.
Remanence _____ $13.0 \times 10^3$ gauss.
Coercive force _____ 700 oersteds.

The pieces 3 and 4 and 5 are manufactured from a high permeability magnetic material such as those sold under the trade names of 2 VPermendur or Supermendur by Bell Telephones Inc.

These materials are such that at a flux density of 15,000 gauss, the working field strength is less than 20 oersteds.

The average flux density in the gap is 5,000 gauss, and over three quarters of the area of the gap is greater than 60% of the maximum flux density in it.

The average flux density in the magnets is 10,500 gauss and the total flux through the gap is 45% of the total flux through the magnets 1 and 2.

The dimensions of the magnet assembly is as follows:

| | Mm. |
|---|---|
| Height of gap | 0.75 |
| Total length of the magnets 1 and 2 | 5.75 |
| Thickness of the pieces 3 and 4 | 0.7 |

The total height of the magnetic assembly is therefore given by: $(0.75+5.75+2\times0.7)$ mm. $=7.9$ mm.

Figure 1:
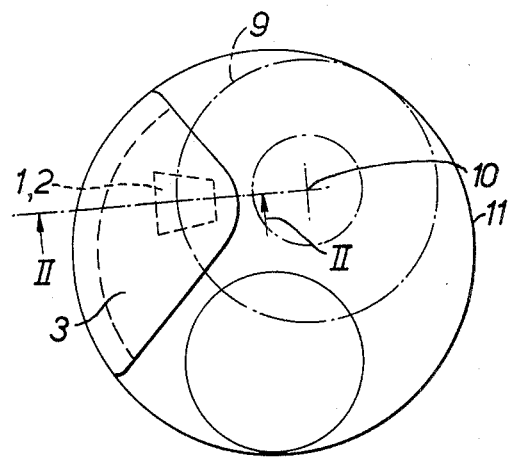
FIGURE 1 is a plan view of the relevant parts of a watch constructed in accordance with the present invention.

The length of the shortest side of magnets 1 and 2 (as seen in FIGURE 1) is greater than 2.25 mm.

The circuit of the watch is shown in FIGURE 3. One end of the trigger coil 12 is connected to the base of a transistor 32 through a hairspring 31 and its other end is connected to the emitter of the transistor 32 through a hairspring 33 and to one end of the drive coil 6. The other end of the coil 6 is connected to the collector of the transistor 32 through a hairspring 34 and a battery 35 in series. A capacitor 36 is connected between the base and the collector of the transistor 32. The hairsprings 31, 33 and 34 regulate the motion of the balance wheel in the usual way and are anchored so that, at rest, the coils 6 and 12 are in the gap between the magnets 1 and 2.

The operation of the watch will now be described. When the coils 6 and 12 pass through the gap between the magnets 1 and 2, an E.M.F. is induced in the coil 12. This E.M.F. is sufficient to bias the transistor 32 "On" and current flows through the coil 6. The current flowing through the coil 6 interacts with the magnetic flux to produce a force which acts on the coil 6 in the sense to maintain the oscillations of the balance wheel. The transistor 32 is biased "Off" when the coils 6 and 12 are outside the gap in the magnetic circuit. The capacitor 36 serves to prevent instability due to feedback tween the drive and trigger coils, and its capacitance is too small to affect the operation of the circuit.

Alternative arrangements of magnets in magnetic circuits are shown in FIGURES 4 to 9. These arrangements are suitable for watches or other horological instruments. In the arrangements shown in FIGURES 4 to 7 two magnets 13 and 14 are disposed on opposite sides of a gap 12 and a member 15 of a high permeability magnetic material provides a flux return path. The faces of the gap 12 are approximately rectangular. In the arrangement shown in FIGURE 4 the sides 16 and 17 of the magnets adjacent to the gap are at an angle to the sides 18 and 19 of the magnets 13 and 14. The direction of least reluctance of the magnets 13 and 14 is at right angles to the sides 18 and 19 and at an angle to the sides 16 and 17 but this has little effect on the magnitude of "fringing."

In the arrangement shown in FIGURE 8 a single permanent magnet 21 and a member 20 of a high permeability magnetic material are arranged to form a magnetic circuit with a gap 22. The direction of least reluctance in the magnet 21 is parallel to its major sides. There is an increased amount of "fringing" in this arrangement as the reluctance in the member 20 is equal in all directions, and the tendency of the flux to remain parallel to the major sides of the magnet 21 is reduced.

The arrangement shown in FIGURE 9 has two pairs of magnets 25 and 26, and 27 and 28, and two members 23 and 24 of a high permeability magnetic material arranged to form a magnetic circuit having two gaps 29 and 30. The path of the flux is the magnet 25, the gap 29, the magnet 26, the member 23, the magnet 27, the gap 30, the magnet 28, and the member 24. The sides of the magnets 25 and 27 adjacent to the gaps 29 and 30 respectively are north poles and the sides of the magnets 26 and 28 adjacent to the gaps 29 and 30 respectively are south poles.

The sides of the magnets adjacent to the gaps in the arrangements shown in FIGURES 1 to 9 inclusive may be covered with slices of high permeability magnetic material which may be shaped to modify the flux distribution across the gap. The total length of the slices in the direction of the magnetic flux is preferably less than the length of the gap in the direction of the magnetic flux. It is, however, usually preferable that the magnet sides should form the faces of the gap.

In the arrangements shown in FIGURES 4 to 9, the length of the gap in the direction of the magnetic flux is less than one sixth of the length of the shortest side of the faces of the gap. The total flux through the gap 12 in the arrangements shown in FIGURES 4 to 7 is 70% of the total flux through the magnets 13 and 14.

I claim:

1. An oscillating motor for a horological instrument, comprising in combination an inertial member mounted for rotational oscillation about an axis, an assembly comprising at least one permanent magnet constructed from a magnetic material having an energy product not less than $5\times10^6$ gauss-oersteds and also comprising at least one member constructed of a high permeability magnetic material, said permanent magnet and said member being disposed relative to one another in said assembly so as to form a magnetic circuit having a gap through which magnetic flux passes, coil means carried by said inertial member, said assembly being so positioned that said coil means pass through said gap during the oscillations of said inertial member to induce voltage pulses in said coil means, and electric pulse generating means connected to said coil means and constructed to pass current pulses through said coil means in response to said voltage pulses, said current pulses and said magnetic flux interacting to produce impulses on said inertial member in the sense to maintain oscillations thereof.

2. The combination claimed in claim 1 wherein said permanent magnet is constructed from a magnetic material having a working field strength of not less than 550 oersteds and a working flux density of not less than 8,000 gauss.

3. The combination claimed in claim 1 wherein said high energy magnetic material is an aluminium-nickel-cobalt-copper-iron alloy.

4. The combination claimed in claim 1 wherein said high permeability magnetic material is such that at a flux density of 15,000 gauss the field strength is not greater than 20 oersteds.

5. The combination claimed in claim 1 wherein said length of the gap in the direction of the magnetic flux is not greater than about one third of the length of any dimension of a face of said gap which passes through the centroid of that face.

6. The combination claimed in claim 1 wherein the length of the gap in said direction of the magnetic flux is not greater than about one sixth of the length of any dimension of a face of said gap which passes through the centroid of that face.

7. The combination claimed in claim 1 wherein the length of the gap in said direction of the magnetic flux is not greater than one third of the length of said magnet in the direction of the magnetic flux.

8. The combination claimed in claim 1 wherein the path of said coil means through said gap subtends an angle of at least 20° about said axis.

9. An oscillatory motor for a horological instrument comprising in combination an inertial member mounted for rotational oscillation about a datum position, first and second permanent magnets each constructed from a magnetic material having an energy product of not less than $5 \times 10^6$ gauss-oersteds, a member constructed from a high permeability magnetic material, said first and second permanent magnets having first and second ends, said first end of said first permanent magnet being adjacent to the said second end of said second permanent magnet with a gap between them, said second end of said first permanent magnet being joined to said first end of said second permanent magnet by said member constructed from a high permeability magnetic material so that magnetic flux passes through said gap, coil means carried by said inertial member and so positioned as to pass through said gap during the oscillations of said inertial member to induce voltage pulses in said coil means, and electric pulse generating means connected to said coil means and constructed to pass current pulses through said coil means in response to said voltage pulses, said current pulses and said magnetic flux interacting to produce impulses on said inertial member in the sense to maintain oscillations thereof.

10. The combination claimed in claim 9 wherein the length of said gap in the direction of the magnetic flux is not greater than one third of the total length of said first and second permanent magnets in the direction of the magnetic flux.

11. The combination claimed in claim 9 wherein said first end of said first permanent magnet and said second end of said second permanent magnet are covered by thin slices of high permeability magnetic material, the total length of the slices in the direction of the magnetic flux being shorter than the length of said gap.

References Cited by the Examiner
UNITED STATES PATENTS

| | | | |
|---|---|---|---|
| 1,255,905 | 2/18 | Messiter | 58—26 |
| 2,916,641 | 12/59 | Held | 310—39 |
| 2,923,123 | 2/60 | Biemiller | 58—28 |
| 2,953,896 | 9/60 | Van Horn et al. | 58—28 |
| 2,954,664 | 10/60 | Biemiller et al. | 58—28 |
| 2,976,435 | 3/61 | Van Horn et al. | 310—39 |
| 3,010,037 | 11/61 | Van Horn et al. | 310—39 |
| 3,015,206 | 1/62 | Detwiler et al. | 58—28 |
| 3,046,460 | 7/62 | Zemla | 318—132 |
| 3,058,292 | 10/62 | Reese | 58—28 |
| 3,061,796 | 10/62 | Schoninger | 331—110 |

LEYLAND M. MARTIN, *Primary Examiner.*